(12) United States Patent
Shao et al.

(10) Patent No.: US 7,563,841 B2
(45) Date of Patent: Jul. 21, 2009

(54) CEMENT FOR CARBON ARTICLES

(75) Inventors: Richard L. Shao, North Royalton, OH (US); Irwin C. Lewis, Oberlin, OH (US)

(73) Assignee: GrafTech International Holdings Inc., Pharma, OH (US)

( * ) Notice: Subject to any disclaimer, the term of this patent is extended or adjusted under 35 U.S.C. 154(b) by 267 days.

(21) Appl. No.: 11/677,613

(22) Filed: Feb. 22, 2007

(65) Prior Publication Data
US 2007/0218272 A1    Sep. 20, 2007

Related U.S. Application Data

(63) Continuation-in-part of application No. 11/137,111, filed on May 25, 2005, now Pat. No. 7,232,606.

(51) Int. Cl.
*C08K 3/04* (2006.01)

(52) U.S. Cl. .................................. 524/496; 524/495
(58) Field of Classification Search ................. 524/495, 524/496
See application file for complete search history.

(56) References Cited

U.S. PATENT DOCUMENTS

| | | | | | |
|---|---|---|---|---|---|
| 2,890,128 | A | * | 6/1959 | Bushong et al. | 106/617 |
| 5,120,478 | A | * | 6/1992 | Castonguay | 264/29.5 |
| 2005/0194576 | A1 | * | 9/2005 | Sirola et al. | 252/500 |

* cited by examiner

*Primary Examiner*—Peter Szekely
(74) *Attorney, Agent, or Firm*—Waddey&Patterson, PC; James R. Cartiglia

(57) ABSTRACT

A cement useful for bonding carbon articles or sealing the surfaces of carbon articles to provide a surface useful for, inter alia, composite tooling or other high temperature applications or for bonding of carbon articles together to form larger blocks.

17 Claims, No Drawings

CEMENT FOR CARBON ARTICLES

RELATED APPLICATION

This application is a continuation-in-part of copending and commonly assigned U.S. patent application Ser. No. 11/137,111, filed in the names of Shao, Miller, Lewis, and Mercuri on May 25, 2005 now U.S. Pat. No. 7,232,606, entitled Sealant for High Strength Carbon Foam, the disclosure of which is incorporated herein by reference.

BACKGROUND OF THE INVENTION

1. Technical Field

The present invention relates to a more environmentally friendly cement for bonding and/or sealing carbon articles such as monolithic carbon foams useful for applications including as composite tooling material. More particularly, the present invention relates to a process and material for cementing together carbon foam articles to permit the formation of functionally-acceptable larger articles or for sealing the surface of blocks of carbon foams to provide a working surface thereon or to permit surfaces of two articles of foam to be cemented together to form larger articles.

2. Background Art

Carbon foams have attracted considerable interest recently because of their properties of low density, coupled with either very high or low thermal conductivity. Indeed, in their U.S. Pat. No. 6,849,098, Joseph and Rogers describe the use of a carbon foam product as tooling for the production of composite materials. Unfortunately, the foams produced by the processes of the Joseph and Rogers patent are unsuitable for use as tooling without the addition of a layer of a so-called facesheet material, because of the pore structure of the foams, including the open-celled nature with highly interconnected pores. The use of such facesheet materials, however, results in either completely or partially filling of the foam cell volume in the Joseph and Rogers disclosure. Filling of cells with these facesheet materials will raise the density and reduce the effectiveness of the foam as a lightweight material for use in composite tooling. In addition, the use of these facesheets creates difficulties in adhesion and in terms of lack of thermal expansion compatibility. Also, the Joseph and Rogers foam products likely do not have the required strength to density ratios needed for tooling and other structural applications, and cannot be produced in sufficiently large blocks for tooling, thus requiring several blocks to be cemented together; while cementing of blocks together can and is successfully done, the more cemented joints that are present, the less structural integrity the resulting block will have.

Recently, a carbon foam has been developed and commercialized under the trademark GRAFOAM by UCAR Carbon Company Inc. of Parma, Ohio and described by Miller, Lewis, and Mercuri in U.S. Patent Publication No. 20060086043. This foam is monolithic and has a controllable cell structure, where the cell structure, strength, and strength to density ratio make the foam suitable for use as composite tooling as well as in other applications. Indeed, a combination of characteristics found in GRAFOAM carbon foam, including strength to density ratios higher than contemplated in the prior art, have been found to be desirable for use of a carbon foam in composite tooling applications.

Cements for carbon bodies have been disclosed in the past. For instance, in U.S. Pat. No. 5,002,981, Chiu discloses a carbonaceous cement paste composition having carbonaceous particles and a resin binder system composed of a high-temperature polymeric resin binder and a thermosettable furfuryl alcohol for dissolving the resin, and a heat-activated catalyst for effecting thermosetting of the furfuryl alcohol upon heating. The carbonaceous particles disclosed by Chiu include graphite flour, coke flour, carbon black, pitch coke flour and calcined lampblack flour. The carbonaceous particles are present at from about 20% to about 85% by weight.

Likewise, in U.S. Pat. No. 6,214,158 to Chiu, Lewis, and Lewis, a cement paste composition is disclosed, including a catalyst, a carbon filler present in an amount of about 20 to about 60% by weight, a polymerizable monomeric system, and a furan solvent. The curable cement composition may be used along with a pre-coat in an adhesive system for attaching together carbon bodies. The carbon filler can be pitch coke flour, petroleum coke flour, graphite powder, coal, carbon black or mixtures thereof.

In U.S. Pat. No. 5,280,063, Lewis, Pirro, Greinke, Bretz, and Kampe disclose a room temperature setting carbonaceous cement comprising a solid carbonaceous material, a catalyst and a liquid carbonizable component which when treated with the catalyst will provide a carbon yield of at least 40% at an elevated baking temperature and possess a flexural strength which is above at least 750 psi at room temperature and at said elevated temperature.

Tyler, in his U.S. Pat. No. 3,441,529, discloses a thermosetting cement for bonding carbonaceous structures, having a mixture of an oil, a soap, finely-divided carbonaceous particles, furfuryl alcohol, a phenolic novolac resin, and a hardening agent.

Furthermore, U.S. Patent Publication No. 20060159905 discloses a sealant material which effectively fills the relatively small cells and bimodal cell structure of the carbon foam of Miller, Lewis, and Mercuri. In addition, the sealant disclosed can seal the mating surfaces of two carbon foam articles so as to permit carbon foam blocks to be cemented together.

Although the prior art discloses various cements useful for carbon articles including carbon foam, many cements pose environmental or health and safety problems. Specifically, cements containing furfuryl alcohol or furfuraldehyde possess a strong odor which evolves during the application and curing of the cement. As such, both the bonding and the cementing of carbon foam articles can be quite unpleasant or unhealthful when conducted in an enclosed space.

What is desired therefore, is a material useful for both cementing and sealing carbon bodies, especially carbon foams whose pore structure, strength, and strength-to-density ratio is suitable for use in applications such as composite tooling, wherein the cementing material does not contain furfuryl alcohol or furfuraldehyde. Also desired is a method for producing such cement.

SUMMARY OF THE INVENTION

The present invention provides a cement material for carbon articles, especially a carbon foam which is uniquely capable of use in applications such as for composite tooling. The inventive cement material can effectively fill the relatively small cells and bimodal cell structure of certain foams, which have a combination of larger and smaller cells. This unique pore structure is particularly advantageous in the foam if the foam is to be used in applications such as composite tooling. Use of the inventive cement thus provides a material useful for composite tooling applications where multiple carbon foam articles need to be joined. In addition, the cement material can also seal the mating surfaces of the carbon foam so as to permit adjoining blocks of carbon foam to be cemented together to provide blocks of sizes not heretofore obtainable in monolithic form. Furthermore, the cement material can be used to seal the surface of carbon foam to provide a working tool surface.

The inventive material comprises a resinous cement having a carbon filler present at a level of between about 30% and about 90% by weight, more preferably about 50% to about 85% by weight, of the cement material. The carbon filler is comprised of two sets of particles having differing size distributions. The two sets of particles in the filler can be denoted a first filler fraction and a second filler fraction. The particles of the first filler fraction preferably have an average diameter at least two times, and more preferably at least four times, the average diameter of the particles of the second filler fraction.

The first filler fraction has a particle size distribution wherein at least 80% of the particles are between about 2 microns and about 500 microns, preferably between about 2 microns and about 300 microns, in diameter. The particles of the first filler fraction advantageously have an average diameter of less than about 120 microns, preferably less than about 100 microns. Most preferably, the average diameter of the particles of the first filler fraction is between about 10 microns and about 90 microns. The first filler fraction should comprise about 20% to about 80% by weight of the inventive cement material, more preferably about 35% to about 65% by weight of the cement.

The second filler fraction comprises particles having an average diameter of between about 0.2 to about 10 microns, more preferably about 0.5 to about 5 microns. In a most preferred embodiment, the second filler fraction comprises particles having an average particle size of about 0.5 to about 2 microns. The second filler fraction comprises about 10% to about 40% of the cement material, by weight, more preferably about 15% to about 35% of the cement material.

The materials from which the filler fractions are made can be the same or different for the two fractions. Preferably, the particles are as close to spherical as possible, having an aspect ratio (the ratio of the diameter of the particle in one direction versus the diameter of the particle in an orthogonal direction, with the larger measurement used as the numerator) of no greater than about 5, more preferably no greater than about 4, in order to provide particles of a relatively low surface area (as compared to particles having a higher aspect ratio) to improve wettability in the cement solution. Nonetheless, filler particles having aspect ratios up to or even greater than about 10 can be used. The filler particles can be any materials, which can be prepared in the desired particle sizes and distributions, including metals and ceramics such as silicon carbide. Most preferably, the filler particles are formed of a carbonaceous material in order to more closely match the coefficient of thermal expansion (CTE) of the foam. The first filler fraction preferably comprises carbon and/or graphite, whereas the second filler fraction preferably comprises carbon black.

To form the inventive cement material, the filler fractions are mixed into a curable material of low enough viscosity to enable coating of the surface of the foam with the cement material. Advantageously, the curable material is a resin system, using either a liquid resin, or a solid resin dissolved in a suitable solvent. The resin system is preferably either thermosetting or thermosettable. The resin system used should, after curing, be stable up to or above the temperatures of the applications for which it is to be employed. For instance, for carbon foam bonded by the inventive cement material in composite tooling applications, where the foam is expected to be exposed to relatively high temperatures, on the order of 200° C. or higher, the resin system should be stable at such temperatures after curing. For lower temperature applications, such as use as structural materials in, e.g., naval vessels, lower temperature stability, such as up to temperatures of 50° C. or higher, is all that is required of the resin system.

In one embodiment of the invention, the cement material comprises a filler comprising two fractions as described above, incorporated into a carbonaceous two component resin system which will set at room temperature to provide a rigid cement with an average strength of at least about 750 psi. This cement increases substantially in strength after fully cured at 150° C. and retains a high strength after heating to 850° C.

This carbonaceous cement material broadly comprises a solid component of a carbonaceous material and a liquid component. This solid component preferably comprises an admixture of carbonaceous particles. The liquid component includes a resin, preferably a resol phenolic, water, and also may include a catalyst such as a strong acid catalyst selected from the group consisting of p-toluene sulfonic acid, benzene sulfonic acid, tri-chloroacetic acid, naphthalene disulfonic acid, benzene disulfonic acid, tri-fluroacetic acid, sulfuric acid, and methanesulfonic acid.

The liquid component and the solid component of the present cement material when combined together provide a very high carbon yield of from about 40% to about 95% after carbonization, resulting in retention of strength at high temperatures.

As noted, the resin in the cement material of the invention is a resin which is stable in its cured state at temperatures up to about 300° C. or even as high as about 400° C., or higher. In addition, the resin, before it is cured, should be soluble and able to form a relatively homogeneous liquid to allow the combining of the high-temperature resin with the other components to form the cement material. The preferred resin is a liquid phenolic resole, a condensed product of a phenol and an aldehyde.

The use of the inventive cement material requires an understanding of the porous nature of carbon foams. The surface voids of the carbon foam need to be adequately sealed before applying cements. Without sufficiently sealing the surface voids, the liquid binder phase (resin) of the cement will be wicked into the pores of the carbon foam resulting in a binder-deprived joint and, consequently, poor joint properties. Conventional liquid pre-coat is not workable because of its low viscosity and the high porosity of carbon foam. It is important to minimize the penetration of liquid binder phase (resin) into the foam, otherwise the foam properties may be changed and warping and/or cracking may occur due to stresses generated after the resin is cured and shrinks.

One unique carbon foam for which the inventive cement material can be used has a density of about 0.05 to about 0.8 grams per cubic centimeter ($g/cm^3$), with a compressive strength of at least about 900 pounds per square inch (psi) (measured by, for instance, ASTM C695). An important characteristic for the foam when intended for use in a high temperature application is the ratio of strength to density. For such applications, a ratio of strength to density of at least about 5000 $psi/(g/cm^3)$ is desired, more preferably at least about 8000 $psi/(g/cm^3)$.

The carbon foam should have a relatively uniform distribution of cell sizes in order to provide the required high compressive strength. In addition, the cells should be relatively isotropic, by which is meant that the cells are relatively spherical, meaning that the cells have, on average, an aspect ratio of between about 1.0 (which represents a perfect spherical geometry) and about 2, more preferably less than about 1.25. The aspect ratio is determined by dividing the longer dimension of any cell with its shorter dimension.

The foam should have a total porosity of about 50% to about 95%, more preferably about 60% to about 95% (it will be recognized that, in conventional industry parlance, the terms "pores" and "cells" are sometimes used interchangeably, especially when discussing porosity, size and distribution). In addition, it has been found highly advantageous to have a bimodal pore distribution, that is, a combination of two average pore sizes, with the primary fraction being the larger size pores and a minor fraction of smaller size pores. Preferably, of the pores, at least about 90% of the pore volume, more preferably at least about 95% of the pore volume should be the larger size fraction, and at least about 1% of the pore volume, more preferably from about 2% to about 10% of the pore volume, should be the smaller size fraction.

The larger pore fraction of the bimodal pore distribution in the carbon foam should be about 10 to about 150 microns in diameter, more preferably about 15 to about 95 microns in diameter, most preferably about 25 to about 95 microns in diameter. The smaller fraction of pores should comprise pores that have a diameter of about 0.8 to about 3.5 microns, more preferably about 1 to about 2 microns. The bimodal nature of the subject carbon foams provides an intermediate structure between open-celled foams and closed-cell foams, thus limiting the liquid permeability of the foam while maintaining a foam structure. Indeed, advantageously, the inventive carbon foams should exhibit a nitrogen gas permeability of no greater than about 10.0 darcys, more preferably no greater than about 2.0 darcys (as measured, for instance, by ASTM C577).

Advantageously, to produce an advantageous carbon foam, a polymeric foam block, particularly a phenolic foam block, is carbonized in an inert or air-excluded atmosphere, at temperatures which can range from about 500° C., more preferably at least about 800° C., up to about 3200° C., to prepare carbon foams useful in high temperature applications.

An object of the invention, therefore, is a cement material for sealing a surface of a carbon articles, such as carbon foam, to provide a surface which enables the foam to be employed in high temperature applications such as composite tooling applications.

Another object of the invention is a cement material for carbon foam which provides a mating surface for bonding two blocks of carbon foam together.

Yet a further object of the invention is a cement material for adjoining multiple carbon foam articles to form a larger carbon foam element.

Another object of the invention is a cement material which does not contain furfuryl alcohol.

Still another object of the invention is a cement material which does not contain furfuraldehyde.

Yet another object of the invention is a process for producing a carbon foam which can be produced in a desired size and configuration, and which can be joined to provide larger carbon foam structures.

These aspects and others that will become apparent to the artisan upon review of the following description can be accomplished by providing a cement for carbon foams, which includes a resinous cement having a filler formed of two sets of particles, a first filler fraction and a second filler fraction, each having differing size distributions, with the average diameter of the particles of the first filler fraction at least twice the average diameter of the particles of the second filler fraction. The first filler fraction preferably has a particle size distribution wherein at least 80% of the particles are between about 2 microns and about 500 microns in diameter, more preferably wherein at least 80% of the particles are between about 2 microns and about 300 microns in diameter. The particles of the first filler fraction advantageously have an average diameter of less than about 120 microns, and are about 35% to about 65% by weight of the cement. Preferably, the second filler fraction comprises particles having an average particle size of between about 0.2 to about 10 microns, and is about 15% to about 35% of the cement by weight. Advantageously, the first filler fraction and the second filler fraction each include carbonaceous particles, more specifically where the first filler fraction comprises particles of coke, coal or graphite and the second filler fraction comprises particles of carbon black.

The inventive cement further includes a resin system of low enough viscosity to enable coating of the surface of foam with the cement, and which is, after curing, stable up to or above the temperatures of the applications for which it is to be employed, more preferably up to temperatures of at least about 300° C., even up to about 400° C. or higher.

The carbon foam used in the invention preferably has a porosity of between about 50% and about 95%, and has pores of the carbon foam which have, on average, an aspect ratio of between about 1.0 and about 2.0. Advantageously, at least about 90% of the pore volume of the pores of the carbon foam have a diameter of between about 10 and about 150 microns; more preferably, at least about 95% of the pore volume of the pores of the carbon foam have a diameter of between about 25 and about 95 microns.

At least about 1% of the pore volume of the pores of the foam should have a diameter of between about 0.8 and about 3.5 microns; better yet, from about 2% to about 10% of the pore volume of the pores of the carbon foam should have a diameter of about 1 to about 2 microns. A suitable carbon foam has a nitrogen gas permeability of no greater than about 10 darcys.

The inventive cement material does not contain either furfuryl alcohol or furfuraldehyde. Both of these chemicals contain furan which has a slight burning odor similar to that of ether. Specifically, the odor threshold for furfuryl alcohol is at about 8 parts per million, thus generating a perceptible burning odor even at low concentrations.

It is to be understood that both the foregoing general description and the following detailed description provide embodiments of the invention and are intended to provide an overview or framework of understanding to nature and character of the invention as it is claimed.

DETAILED DESCRIPTION OF THE PREFERRED EMBODIMENTS

Carbon foams especially useful in combination with the cement material in accordance with the present invention are prepared from polymeric foams, such as polyurethane foams or phenolic foams, with phenolic foams being preferred. Phenolic resins are a large family of polymers and oligomers, composed of a wide variety of structures based on the reaction products of phenols with formaldehyde. Phenolic resins are prepared by the reaction of phenol or substituted phenol with an aldehyde, especially formaldehyde, in the presence of an acidic or basic catalyst. Phenolic resin foam is a cured system composed mainly of closed cells. The resins are generally aqueous resoles catalyzed by sodium hydroxide at a formaldehyde to phenol ratio which can vary, but is preferably about 2:1. Free phenol and formaldehyde content should be low, although urea may be used as a formaldehyde scavenger.

The phenolic resin foam is prepared by adjusting the water content of the phenolic resin and adding: a surfactant (e.g., an ethoxylated nonionic), a blowing agent (e.g., pentane, methylene chloride, or chlorofluorocarbon), and a catalyst (e.g., toluene sulfonic acid or phenol sulfonic acid). The sulfonic acid catalyzes the reaction, while the exotherm causes the blowing agent, emulsified in the resin, to evaporate and cause foaming. The surfactant controls the cell size as well as the ratio of open-to-closed cell units. Both batch and continuous processes are employed. In the continuous process, the machinery is similar to that used for continuous polyurethane foam. The properties of the foam depend mainly on density and the cell structure.

The preferred phenol is resorcinol, however, other phenols of the kind which are able to form condensation products with aldehydes can also be used. Such phenols include monohydric and polyhydric phenols, pyrocatechol, hydroquinone, alkyl substituted phenols, such as, for example, cresols or xylenols, polynuclear monohydric or polyhydric phenols, such as, for example, naphthols, p.p'-dihydroxydiphenyl dimethyl methane or hydroxyanthracenes.

The phenols used to make the foam starting material can also be used in admixture with non-phenolic compounds which are able to react with aldehydes in the same way as phenol.

The preferred aldehyde for use in the solution is formaldehyde. Other suitable aldehydes include those which will react with phenols in the same manner. These include, for example, acetaldehyde and benzaldehyde.

In general, the phenols and aldehydes which can be used in the process of the invention are those described in U.S. Pat. Nos. 3,960,761 and 5,047,225, the disclosures of which are incorporated herein by reference.

The polymeric foam used as the starting material in the production of the inventive carbon foam should have an initial density which mirrors the desired final density for the carbon foam which is to be formed. In other words, the polymeric foam should have a density of about 0.1 to about 0.8 g/cm$^3$, more preferably, about 0.1 to about 0.6 g/cm$^3$. The polymeric foam should have a closed-cell structure with a porosity of between about 65% and about 95% and a relatively high compressive strength, i.e., on the order of at least about 100 psi, and as high as about 300 psi or higher.

In order to convert the polymeric foam to carbon foam, the foam is carbonized by heating to a temperature of from about 500° C., more preferably at least about 800° C., up to about 3200° C., in an inert or air-excluded atmosphere, such as in the presence of nitrogen. The heating rate should be controlled such that the polymer foam is brought to the desired temperature over a period of several days, since the polymeric foam can shrink by as much as about 50% or more during carbonization. Care should be taken to ensure uniform heating of the polymer foam piece for effective carbonization.

By use of a polymeric foam heated in an inert or air-excluded environment, a non-graphitizing glassy carbon foam is obtained, which has the approximate density of the starting polymer foam, but a compressive strength of at least about 900 psi and, significantly, a ratio of strength to density of at least about 5000 psi/(g/cm$^3$), more preferably, at least about 7000 psi/(g/cm$^3$). The carbon foam has a relatively uniform distribution of relatively isotropic cells having, on average, an aspect ratio of between about 1.0 and about 2.0, more preferably between about 1.0 and about 1.25.

The resulting carbon foam has a total porosity of about 50% to about 95%, more preferably about 70% to about 95% with a bimodal cell distribution; at least about 90%, more preferably at least about 95%, of the pore volume of the pores are about 10 to about 150 microns in diameter, more preferably about 15 to about 95 microns in diameter, most preferably about 25 to about 95 microns in diameter, while at least about 1%, more preferably, about 2% to about 10%, of the pore volume of the pores are about 0.8 to about 3.5 microns, more preferably, about 1 to about 2 microns, in diameter. The bimodal nature of the preferred foam provides an intermediate structure between open-celled foams and closed-cell foams, limiting the fluid permeability of the foam while maintaining a foam structure. A nitrogen gas permeability of less than about 10 darcys, even less than about 2.0 darcys, is preferred, depending on the density of the foam.

Typically, characteristics such as porosity and individual pore size and shape are measured optically, such as by use of an epoxy mount with a microscope using bright field illumination, and are determined using commercially available software, such as Image-Pro Software available from Media-Cybernetic of Silver Springs, Md.

As described above, the inventive cement material comprises a resinous cement having a filler, especially a carbonaceous filler, present at a level of between about 20% and about 85% by weight, more preferably about 50% to about 85% by weight, of the cement material. The filler is comprised of two sets of particles having differing size distributions, which can be referred to as a first filler fraction and a second filler fraction. The average diameter of the particles of the first filler fraction should be at least two times and, preferably, at least four times, that of the particles of the second filler fraction.

As discussed above, the first filler fraction has a particle size distribution wherein at least 80% of the particles are between about 2 microns and about 500 microns, preferably between about 2 microns and about 300 microns, in diameter. The particles of the first filler fraction advantageously have an average diameter of less than about 120 microns, preferably less than about 100 microns. Most preferably, the average diameter of the particles of the first filler fraction is between about 10 microns and about 90 microns. The first filler fraction should comprise about 50% to about 85% by weight of the inventive cement material.

Again, as discussed above, the second filler fraction comprises particles having an average particle size of between about 0.2 to about 10 microns, more preferably about 0.5 to about 5 microns. In a most preferred embodiment, the second filler fraction comprises particles having an average particle size of about 0.5 to about 2 microns. The second filler fraction comprises about 10% to about 40% of the cement material, by weight, more preferably about 15% to about 35% of the cement material.

The two filler fractions can be the same or different materials, although it is preferred that the particles are as close to spherical as possible, having an aspect ratio (the ratio of the diameter of the particle in one direction versus the diameter of the particle in an orthogonal direction, with the larger measurement used as the numerator) of no greater than about 5, preferably no greater than about 4, in order to provide particles of a relatively low surface area (as compared to particles having a higher aspect ratio) to improve wettability of the cement. Nonetheless, filler particles, having aspect ratios up to or greater than about 10, can be used. The filler particles can be any materials, which can be prepared in the desired particle sizes and distributions (and shape), including metals and ceramics such as silicon carbide. Most preferably, the filler particles are formed of a carbonaceous material in order to more closely match the coefficient of thermal expansion (CTE) of the carbon article. The first filler fraction preferably comprises particles of carbon and/or graphite, especially coke or graphite powder (or flour). The second filler fraction preferably comprises carbon black. One suitable carbon black that can be used is available under the tradename THERMAX from the Cancarb Company of Medicine Hat, Alberta, Canada. An additional filler material that can be employed as either the first filler fraction or the second filler fraction is carbonized phenolic microballoons, present as spheres up to about 90 microns in average diameter and which are available from, e.g., Asia Pacific Microballoons.

Preferably, the carbonaceous cement material of the present invention is provided as a two-component system. The two-component system includes a solid portion and a liquid portion with the solid portion preferably comprising a mixture of the carbonaceous filler fractions described above and optionally a solid catalyst. The solid acid catalyst should be selected from the group consisting of p-toluene sulfonic acid, benzene sulfonic acid, trichloroacetic acid, naphthalene disulfonic acid, benzene disulfonic acid, trifluroacetic acid, sulfuric acid, and methanesulfonic acid. When the phenolic resin is a novolac, the catalyst should be an amine such as hexamethylene tetramine.

The liquid portion comprises a phenolic resin in water. Specifically, neither furfuraldehyde nor furfuryl alcohol is present in the novel cement material but rather the liquid portion of the cement material is a blend of phenolic resin with water. Furfuryl alcohol, with its burning odor is not necessary for the inventive cement material as the selected resins will be soluble in water. One suitable phenolic resin that can be used for the cement material and which is soluble with water is the resin available under the trade name GP-5200 from Georgia Pacific, Atlanta, Ga.

In one embodiment, the resin portion preferably GP-5200 is present in the cement material of from about 10% by weight to about 40% by weight. The liquid portion of the cement material containing this percentage range of a phenolic resin will cure to give a cure yield of from about 40% to about 98% for the total cement material. The water portion of the liquid component of the cement material is up to about 15% by weight.

In a further embodiment, the solid component of the cement material may include a phenolic solid resin constituent. One example of a suitable solid phenolic resin is sold under the trade name GP-2006 from Georgia Pacific of Atlanta, Ga.

The minimum concentration of catalyst to achieve a room temperature setting will depend upon the selection of the catalyst. When p-toluene sulfonic acid is used as the acid catalyst a room temperature setting can be achieved in less than twenty-four hours with as little as about 2.0 weight percent acid catalyst based upon the weight of the cement material.

If increased electrical conductivity is required for the cement material, as in certain applications, iron or steel powder, or any other electrically conductive material, can be added to the solid portion of the cement material. Suitable amounts of iron or steel particles in the total cement material of the present invention are from 10% to 40% by weight, preferably from 20% to 30% by weight. A larger amount of p-toluene sulfonic acid is required for room temperature setting when iron or steel particles are present. When the catalyst is p-toluene sulfonic acid, then the weight of catalyst required is about twice that used for a cement material prepared without the addition of iron.

As described, the resin in the cement material of the invention is a resin which is stable in its cured state at temperatures up to the temperature of the application for which the foam is intended. Preferably, the resin in the cement material is stable in its cured state at temperatures up to about 300° C. or higher in air. In addition, the resin, before it is cured, should be soluble in water to form a relatively homogeneous liquid to allow the combining of the high-temperature resin with the other components to form the cement material.

The cement material of this embodiment of the invention is produced by mixing the individual components together by any suitable method using known equipment for mixing like materials. Additionally, the order in which the components are mixed is not critical.

To use the inventive cement, the cement is applied to the surface of the foam with a gentle, rotational motion to work the filler particles of the material into the open surface voids and fill them as completely as possible in order to substantially block the pores. The relatively low liquid content in the cement limits the extent of penetration. Excess cement material is then wiped off to allow the best possible surface condition. Thus, the inventive cement provides a relatively vacuum tight surface on the carbon foam surface to which it is applied, which permits the use of the foam in applications such as for composite tooling.

When used to prepare a surface for bonding, the cement is applied after the respective mating surfaces of the carbon foam are sealed (indeed, the process of sealing the surface of the article can be repeated for even better sealing). The surfaces are then joined together, and resulting assembly is heated to a temperature to cure the cement. Preferably a compressive load is applied to the joint after joining the surfaces. The joint is heated to a temperature sufficient to cure the cement and bond the surfaces together. After curing, the assembly of foam blocks joined can be post-cured at a temperature equal to or greater than the highest temperature the foam is expected to encounter in use.

Accordingly, by the practice of the present invention, a cement material having, heretofore, unrecognized characteristics is prepared. This cement material is uniquely capable of adjoining carbon foams for use in applications such as composite tooling while not possessing the environmental or health and safety disadvantages associated with either furfuraldehyde or furfuryl alcohol.

The disclosures of all cited patents and publications referred to in this application are incorporated herein by reference.

The above description is intended to enable the person skilled in the art to practice the invention. It is not intended to detail all of the possible variations and modifications that will become apparent to the skilled worker upon reading the description. It is intended, however, that all such modifications and variations be included within the scope of the invention that is defined by the following claims. The claims are intended to cover the indicated elements and steps in any arrangement or sequence that is effective to meet the objectives intended for the invention, unless the context specifically indicates the contrary.

What is claimed is:

1. A cement material for carbon articles comprising an admixture of filler, resin, water and not including either furfuryl alcohol or furfuraldehyde, wherein the filler comprises a first fraction and a second fraction and further wherein the second fraction has a particle size distribution wherein at least 80% of the particles are between about 0.2 microns and about 10 microns.

2. The cement of claim 1 wherein the filler is a carbonaceous material.

3. The cement of claim 1 wherein the filler comprises of from about 30% to about 90% by weight of the cement.

4. The cement of claim 1 wherein the first fraction has a particle size distribution wherein at least 80% of the particles are between about 2 microns and about 500 microns in diameter.

5. The cement of claim 1 wherein the first fraction comprises from about 20% to about 80% by weight of the cement.

6. The cement of claim 1 wherein the first fraction comprises particles of coke.

7. The cement of claim 1 wherein the first fraction comprises particles of graphite.

8. The cement of claim 1 wherein the second fraction comprises from about 10% to about 40% by weight of the cement.

9. The cement of claim 1 wherein the second fraction comprises particles of carbon black.

10. The cement of claim 1 wherein the resin comprises from about 10% to about 40% by weight of the cement.

11. The cement of claim 1 wherein the resin is soluble in water.

12. The cement of claim 1 wherein the resin is a phenolic resin.

13. The cement of claim 12 wherein the phenolic resin is a resole.

14. The cement of claim 12 wherein the phenolic resin is a novolac.

15. The cement of claim 1 wherein water is present at a level of up to about 15% by weight of the cement.

16. The cement of claim 1 further comprising resin solids.

17. A cement for carbon articles comprising by weight:
    carbonaceous flour from about 20% to about 80%;
    carbon black from about 10% to about 40%;
    phenolic resin from about 10% to about 40% by weight; and
    water which is present at a level of up to about 15% by weight.

* * * * *